United States Patent
Zheng et al.

(10) Patent No.: US 10,232,566 B2
(45) Date of Patent: Mar. 19, 2019

(54) THREE-DIMENSIONAL PRINTER AND PRINTING ACCURACY DETECTION METHOD

(71) Applicants: INVENTEC APPLIANCES (PUDONG) CORPORATION, Shanghai (CN); INVENTEC APPLIANCES CORP., New Taipei (TW); INVENTEC APPLIANCES (SHANGHAI) CO. LTD., Shanghai (CN)

(72) Inventors: Yong-Ping Zheng, Shanghai (CN); Shih-Kuang Tsai, Shanghai (CN)

(73) Assignees: Inventec Appliances (Pudong) Corporation, Shanghai (CN); Inventec Appliance Corp., New Taipei (TW); Inventec Appliances (Shanghai) Co., Ltd., Shanghai (CN)

( * ) Notice: Subject to any disclaimer, the term of this patent is extended or adjusted under 35 U.S.C. 154(b) by 386 days.

(21) Appl. No.: 15/017,318

(22) Filed: Feb. 5, 2016

(65) Prior Publication Data
US 2017/0001378 A1 Jan. 5, 2017

(30) Foreign Application Priority Data
Jun. 30, 2015 (CN) .......................... 2015 1 0375730

(51) Int. Cl.
| | | |
|---|---|---|
| *B33Y 10/00* | (2015.01) | |
| *B33Y 80/00* | (2015.01) | |
| *B29C 67/00* | (2017.01) | |
| *B33Y 30/00* | (2015.01) | |
| *B33Y 50/02* | (2015.01) | |

(52) U.S. Cl.
CPC .......... *B29C 67/0088* (2013.01); *B33Y 10/00* (2014.12); *B33Y 30/00* (2014.12); *B33Y 50/02* (2014.12); *B29C 67/0059* (2013.01); *G05B 2219/49023* (2013.01)

(58) Field of Classification Search
CPC ............................... B33Y 50/02; B33Y 80/00
USPC ......................... 700/117, 118, 119, 98, 120
See application file for complete search history.

(56) References Cited

U.S. PATENT DOCUMENTS

| | | | |
|---|---|---|---|
| 2013/0206726 A1* | 8/2013 | Oono ................ | H01L 21/67253 216/85 |
| 2016/0176115 A1* | 6/2016 | Becker .................. | B25J 9/1679 425/150 |

\* cited by examiner

*Primary Examiner* — Michael J Brown
(74) *Attorney, Agent, or Firm* — Muncy, Geissler, Olds & Lowe, P.C.

(57) ABSTRACT

A three-dimensional printer with detecting printing accuracy and a method for detecting printing accuracy is provided. The three-dimensional printer with printing accuracy detection includes a three-dimensional model conversion unit, a printing path locating unit, a printing path drawing unit, and a comparison unit. An actual printing path is drawn according to the real-time captured location information of a nozzle head of the three-dimensional printer and compared with a predetermined printing path, which may implement the detection of printing accuracy. The method for detecting printing accuracy may implement the accuracy detection of the three-dimensional printer and be capable of detecting the accuracy for the three-dimensional printer. The method for detecting printing accuracy also reminds an operator to check and maintain printing accuracy of the three-dimensional printer.

9 Claims, 4 Drawing Sheets

THREE-DIMENSIONAL PRINTER AND PRINTING ACCURACY DETECTION METHOD

FIELD OF THE INVENTION

The present invention relates to three-dimensional printing technology, particularly relates to a three-dimensional printer with printing accuracy detection and a method for detection printing accuracy of a three-dimensional printer.

BACKGROUND OF THE INVENTION

Three-dimensional printing is a technology of fast forming. Data of three-dimensional model designed by designer is inputted into a three-dimensional printer and a final object with respect to the data is formed by drawing out layer-by-layer material that includes adhesive materials of metallic powder or plastic. Such implementation by the three-dimensional printer is called additive manufacturing, which directly manufactures a three-dimensional physical model totally corresponding to a mathematical model by adding materials and layer-by-layer forming according to the three-dimensional STL model data. Such an approach is characteristic of manufacturing an object of any shape and totally different from traditional forming method by material removal.

Three-dimensional printing technology has been developing and being emphasized these years. There are more and more manufacturers developing three-dimensional printing technologies to meet various requirements. Qualities of a physical object may be judged by some standards in which the accuracy of a model is the most important indicator. The accuracy for a model indicates the degree of shape matching between the physical object and its model.

However, current three-dimensional printer lacks approaches of real-time detection accuracy and can only rely on passive ways such as on-site manual checking or remotely capturing photos. These passive ways often have drawbacks. For example, malfunction or errors can neither be detected or alarmed because of lack of real-time active detection, raising alarm and taking corrective action. The malfunction or errors then causes failures in printing and the wasting of time and material. Also, without quantifying the resulting degrees of matching, the accuracy of model shape cannot be objectively judged, so it only depends on subjective manual judgment.

SUMMARY OF THE INVENTION

To resolve issues aforementioned, a three-dimensional printer with printing accuracy detection is provided, which includes: a three-dimensional model conversion unit configured to convert a printing path of each layer of a three-dimensional model into data in sequence and layer-by-layer simulate slicing of the data to acquire a predetermined printing path of the each layer of the three-dimensional model; a printing path locating unit configured to real-time capture a location information of a nozzle head; a printing path drawing unit coupled with the printing path locating unit and configured to draw out an actual printing path of the each layer according to the location information of the nozzle head; and a comparison unit configured to compare the predetermined printing path and the actual printing path to acquire a matching result for detecting printing accuracy.

In one embodiment, an alarm unit configured to provide an alarm if the matching result is over a predetermined value.

In one embodiment, the printing path locating unit includes a distance measurement apparatus configured to real-time capture the location information of the nozzle head.

In one embodiment, an injection rate acquisition unit is configured to real-time capture an injection rate of the nozzle head, and the printing path drawing unit draws out the actual printing path according to the location information of the nozzle head and the injection rate of the nozzle head.

In one embodiment, an injection rate detection unit is configured to real-time compare a predetermined injection rate of the nozzle head and a current injection rate of the nozzle head to determine whether the current injection rate of the nozzle head is within a normal range.

In one embodiment, the current injection rate of the nozzle head is estimated with a height of material at each position of the nozzle head, and wherein a determined height of the material is set to be H with a X tolerance, and when an actual height of an extruded material by the nozzle head is over X tolerance during printing a current layer, the amount of the extruded material is adjusted during printing of a next layer for equalizing a height deviation of the actual printing.

In one embodiment, the comparison unit acquires the matching result by analyzing a line curvature tolerance.

In one embodiment, the comparison unit acquires the matching result by analyzing an area matching degree.

Accordingly, a method for detecting printing accuracy of a three-dimensional printer includes: converting a printing path of each layer of a three-dimensional model into data in sequence and layer-by-layer simulating slicing of the data to acquire a predetermined printing path of the each layer of the three-dimensional model; real-time capturing a location information of a nozzle head of the three-dimensional printer; and comparing the predetermined printing path and an actual printing path to acquire a matching result for detecting printing accuracy.

In one embodiment, the method further includes real-time capturing an injection rate of the nozzle head; and drawing the actual printing path according to the location information of the nozzle head and the injection rate of the nozzle head.

Accordingly, a three-dimensional printer with printing accuracy detection includes a three-dimensional printer and a three-dimensional model conversion unit, a printing path locating unit, a printing path drawing unit, and a comparison unit. An actual printing path is drawn according to the real-time captured location information of the nozzle head and compared with a predetermined printing path, which may implement the detection of printing accuracy. The detection method for printing accuracy and the three-dimensional printer with printing accuracy detection may implement the accuracy detection and be capable of detecting the accuracy for the three-dimensional printer, as well as reminding operator to execute accuracy maintaining matters for the three-dimensional printer.

BRIEF DESCRIPTION OF THE DRAWINGS

Objects and advantages of the present invention will become more readily apparent to those ordinarily skilled in the art after reviewing the following detailed description and accompanying drawings, in which.

DETAILED DESCRIPTION OF THE PREFERRED EMBODIMENT

Figure 1:
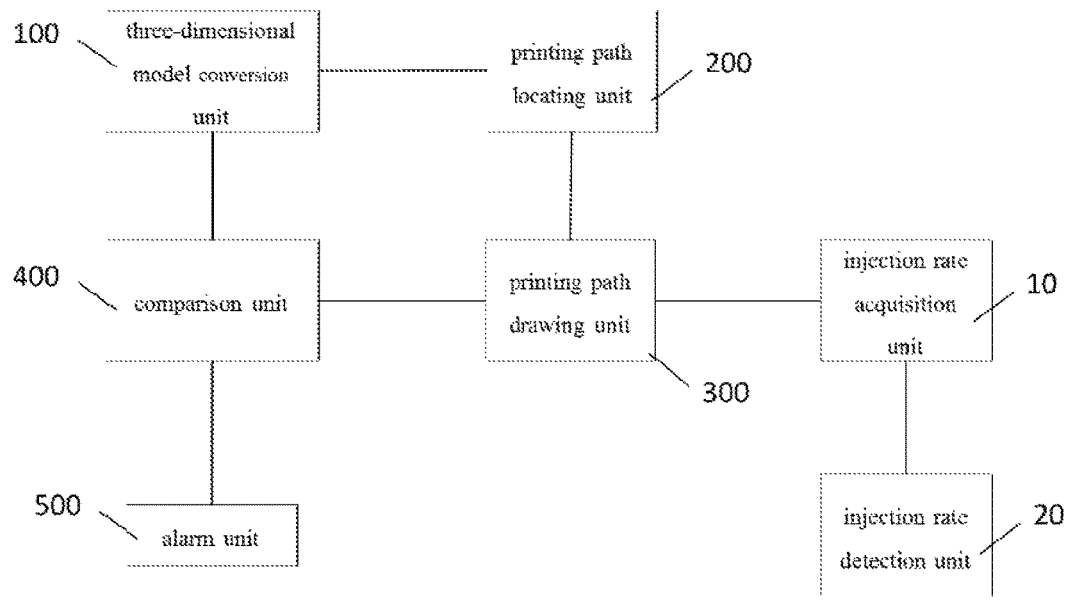
FIG. 1 is a schematic block diagram illustrating an exemplary three-dimensional printer according to the present invention.

A three-dimensional printer with detecting printing accuracy of the present invention is shown on FIG. 1. The three-dimensional printer with printing accuracy detection includes a three-dimensional model conversion unit 100, a printing path locating unit 200, a printing path drawing unit 300, and a comparison unit 400 coupled with each another. Optionally, on consideration of abnormal situations, the three-dimensional printer with printing accuracy detection may be equipped with an alarm unit 500 configured to provide an alarm if a matching result is over a predetermined value.

For a three-dimensional model to be printed, the three-dimensional model conversion unit 100 acquires a predetermined printing path of each layer by capturing printing path of each layer of the three-dimensional model, converts them into data in sequence, layer-by-layer transmits the data and simulates slicing. After receiving data to be printed, the three-dimensional printer actuates XYZ motors and controls a nozzle head for printing. In the meantime, the printing path locating unit 200 real-time captures location signals of the printing paths from the nozzle head and transmits them to the printing path drawing unit 300 for drawing out actual printing paths of the nozzle head. The comparison unit 400 compares the predetermined printing paths and the actual printing paths and analyzes them to acquire a matching result relative to detecting printing accuracy. The matching result over a predetermined threshold or level indicates printing errors happen in printing, and the three-dimensional printer will stop printing after alarming. Provided that printing is normally processed and completed, a comparison result for the data of the each layer will be got.

The three-dimensional model conversion unit 100 is configured to execute the data conversion from the three-dimensional model, layer-by-layer transmit the data and simulate slicing for the acquisition of ideal printing path of the three-dimensional printer. Besides, the three-dimensional model conversion unit 100 may effectively remove inner and outer supporting data, which is beneficial to compare the ideal printing path and the actual printing path. Preferably, take a three-dimensional model as an example. The model is sliced into M number of layers and each layer may be correspondingly to some specific information such as series printing control commands. Data characteristics of the each layer are combined for scheduling a reasonable printing path by a general method. The three-dimensional model conversion unit 100 controls the number of layers according to printing precision requirement. That is also to say, according to the printing precision, the three-dimensional model conversion unit 100 quantifies the number of the layers of the three-dimensional model to make printing data accurate and precise.

The printing path locating unit 200 captures signals of printing paths for the nozzle head that actually executes printing of an object, which needs to capture real-time location information of the nozzle head. Accordingly, the three-dimensional printer capable of capturing is necessary. However, how to capture the path or location information is not limited in the present invention.

Figure 2:
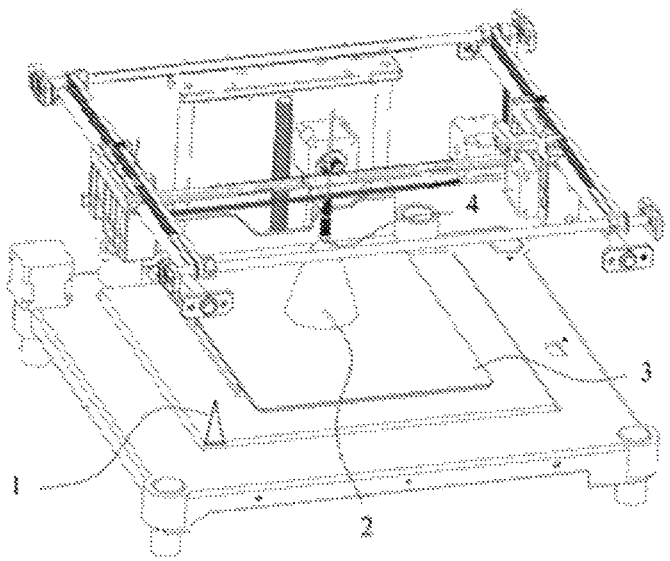
FIG. 2 is a schematic construction diagram illustrating an exemplary three-dimensional printer and a printing path locating unit according to the present invention.

Preferably, shown on FIG. 2, a distance measurement apparatus 1 is arranged on a printing table 3 of the three-dimensional printer and configured to real-time capture the location information of a printing nozzle head 4 during printing an object 2. A locating technology based on distance measurement may measure distances, angles, or directions between a target and multitudes of points by utilizing lateral relation, triangle relation, or maximum likelihood estimation. A main principle of coordinate measurement by trilateration is: an unknown printing nozzle head 4 is represented as point M, and distance d1 is the one from point M to first reference point P. Point M is possibly located on a circle of radius d1 with respect to first reference point P as a center. Next, distance d2 is the one from point M to second reference point Q. Point M is also possibly located on circle of radius d2 with respect to second reference point Q as a center. In this condition, point M is a crossover point on the two circles crossing over with each other. Next, distance d3 is precisely measured from point M to third reference point R, and a circle that has a radius d3 with respect to point R as a center definitely has a crossover point together with the two crossover circles aforementioned. Thus, coordinates of point M is determined by this way.

Figure 3:
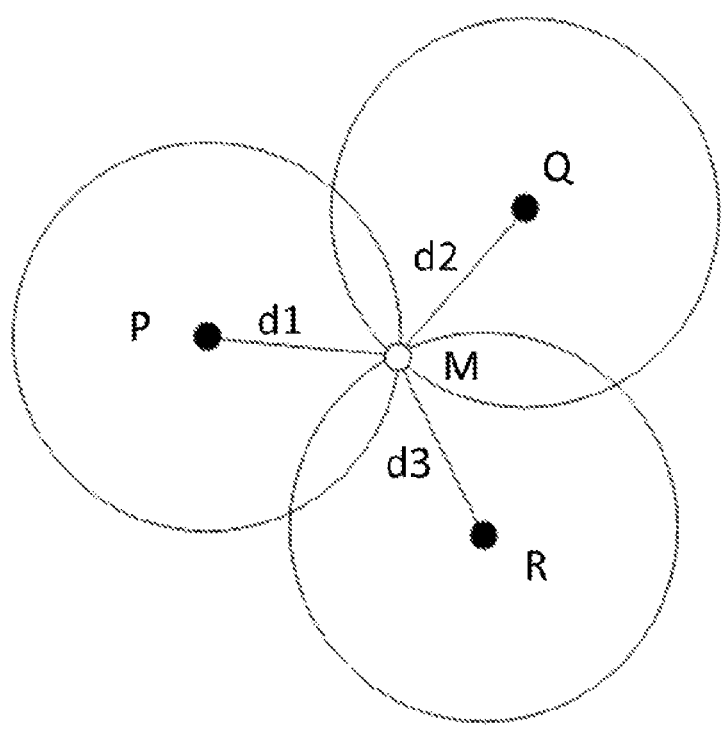
FIG. 3 is a schematic diagram illustrating a principle of calculating nozzle head location in a printing path locating unit of an exemplary three-dimensional printer with printing accuracy detection according to the present invention.

Shown on FIG. 3, the coordinates of reference points P, Q, and R are (x1, y1), (x2, y2), and (x3, y3), respectively, and the distances to point M of the printing nozzle head 4 are d1, d2, and d3. The coordinates of point M is supposed (x, y), and they are described by formula as follows:

$$\sqrt{(x-x_1)^2 + (y-y_1)^2} = d_1$$
$$\sqrt{(x-x_2)^2 + (y-y_2)^2} = d_2$$
$$\sqrt{(x-x_3)^2 + (y-y_3)^2} = d_3$$
$$\begin{bmatrix} x \\ y \end{bmatrix} = \begin{bmatrix} 2(x_1-x_3)2(y_1-y_3) \\ 2(x_2-x_3)2(y_2-y_3) \end{bmatrix}^{-1} \begin{bmatrix} x_1^2 - x_3^2 + y_1^2 - y_3^2 + d_3^2 - d_1^2 \\ x_2^2 - x_3^2 + y_2^2 - y_3^2 + d_3^2 - d_2^2 \end{bmatrix}$$

Preferably, rotation angles of stepper motors in X, Y, and Z directions are measured by a printing detection apparatus and configured to calculate location information of the captured nozzle head. Furthermore, in the embodiment, the three-dimensional printer is further equipped with an injection rate acquisition unit 10 for sensing and measuring the nozzle head. The injection rate acquisition unit 10 is configured to real-time capture injection rate data of the nozzle head. By utilizing the location information and the injection rate data of the nozzle head of the three-dimensional printer, the printing path drawing unit 300 draws out actual printing path to acquire printing profile curve of the nozzle head at any position.

The three-dimensional printer with printing accuracy detection of the present invention further includes an injection rate detection unit 20, and the injection rate detection unit 20 is configured to real-time compare a predetermined injection rate of the nozzle head and a current injection rate of the nozzle head aforementioned to detect whether the current injection rate of the nozzle head is within a reasonable range for the purpose of monitoring printing quality. Preferably, an apparatus capable of monitoring the amount of extruded material or sensing the distance of the nozzle head may be used to real-time capture the amount of extruded material from the nozzle head at any position to determine whether the amount of extruded material reaches a predetermined amount. A determined height of the material is supposed to be H with a X tolerance, and if the actual height of the extruded material by the nozzle head is over X tolerance during printing a current layer, such as the height of the extruded material more than H plus X or fewer than H minus X, the amount of the extruded material may be adjusted during printing of a next layer for equalizing a height deviation of the actual printing.

The printing path drawing unit 300 draws out collecting paths for real-time comparison of a printed path and the predetermined printing path of the same layer in a model. The term "draws out" includes recording printing coordinates in sequence during the nozzle head prints physical object of the model and drawing stereo paths by combining diameter information of the nozzle head into an apparatus of sensing a distance of the nozzle head. The width of one printing path may be acquired according to the width of the nozzle head, and the height of the printing path may be acquired by calculating with the distance of the nozzle head.

Figure 4:
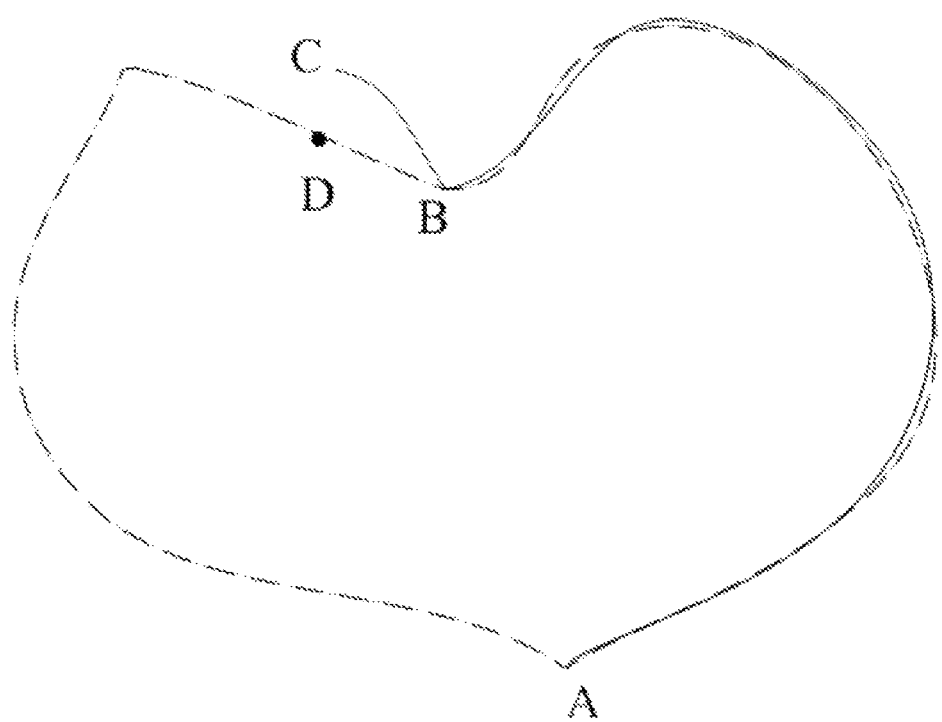
FIG. 4 is a schematic diagram illustrating an exemplary comparison of a predetermined printing path and an actual printing path according to the present invention.

The comparison unit 400 compares the predetermined printing path and the actual printing path of the real-time nozzle head on the same layer to determine a deviation degree. There are many methods to implement the comparison calculation for the deviation degree, such as line curvature tolerance that calculates matching degrees with matching ratios or area-mapping calculation. Shown in FIG. 4, a dot line represents the predetermined printing path, and a solid line represents the actual printing path. Depicted as FIG. 4, though there is a little deviation from a start point A to another point B, however, the deviation is within an acceptable range. A shift after the point B is possible due to errors in the stepper motor, which causes the actual printing path of a point C instead of a correct point D. A tolerance range for the deviation may be set and utilized by the alarm unit 500 that may alarm and stop printing once a current deviation is over the tolerance range. A deviation of an elevation may be acquired by slicing in longitudinal direction and comparing mapping degrees by a projection method.

Figure 5:
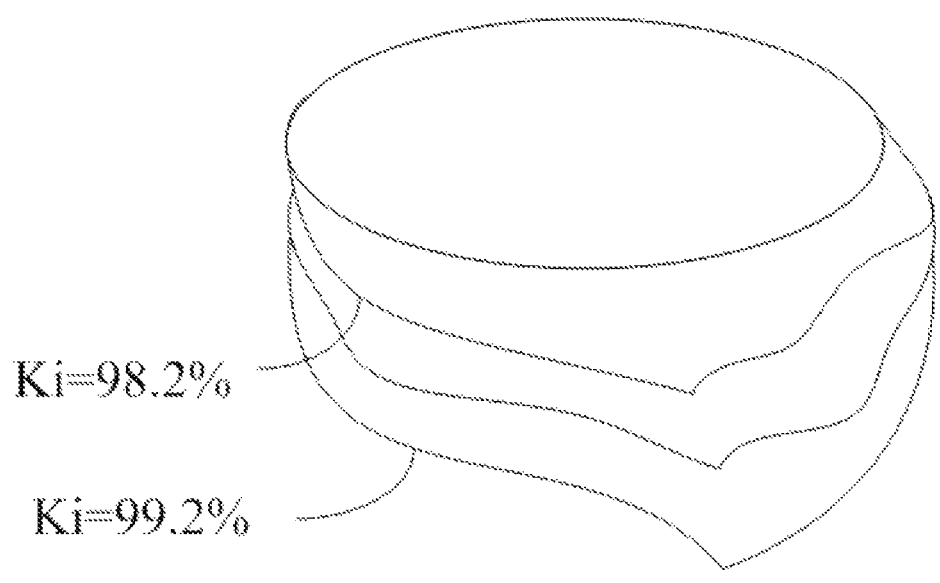
FIG. 5 is a schematic diagram illustrating an exemplary area comparison of a predetermined printing path and an actual printing path according to the present invention.

Shown on FIG. 5, the calculation for matching degree of a front body is implemented by a following way: i number of slicing layer and area Mi of predetermined simulated printing path are recorded, as well as area Ni of actual printing path on the area of simulated printing path. Then matching degree (accuracy) may be acquired by a formula of Ki=(Ni/Mi)*100%, and the matching degree for the whole model may be acquired by averaging ones of all slicing layers.

Figure 6:
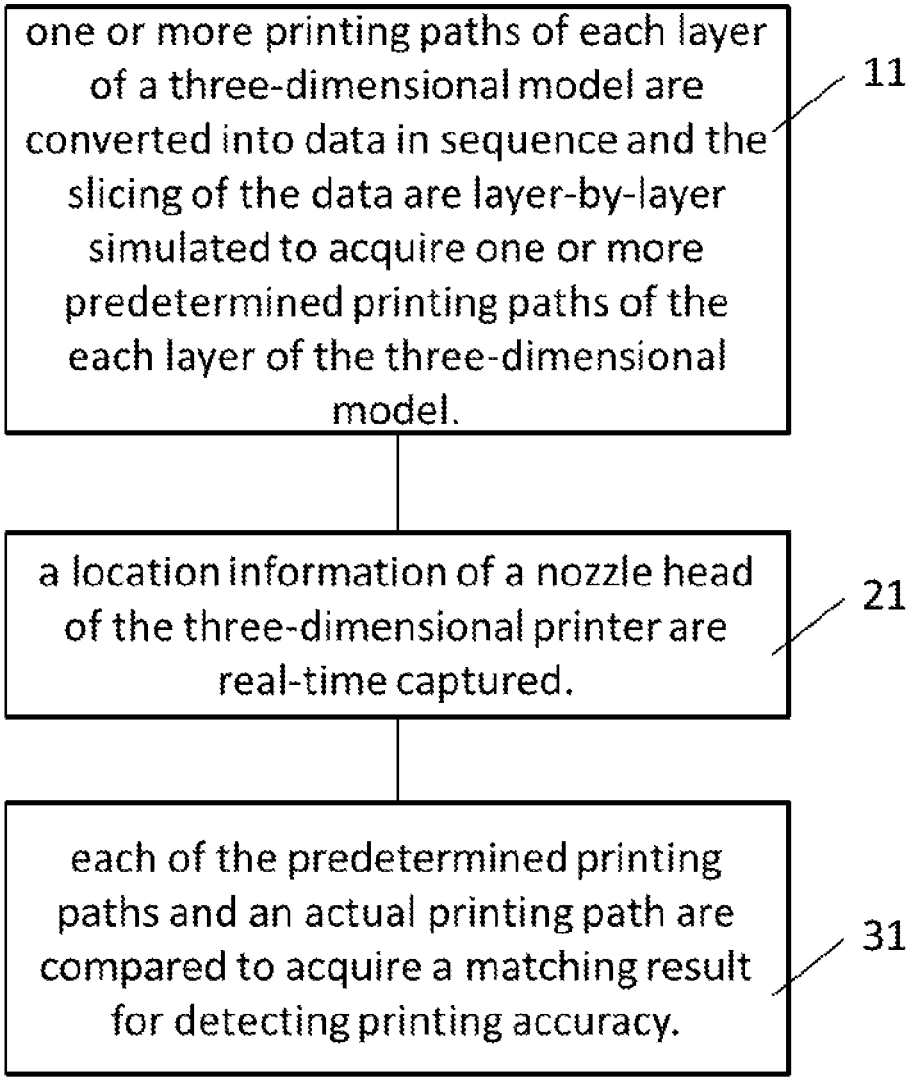
FIG. 6 is a schematic diagram illustrating an exemplary printing accuracy detection method of according to the present invention.

@@Shown on FIG. 6, a method of detecting printing accuracy for a three-dimensional printer is provided. Step 11: one or more printing paths of each layer of a three-dimensional model are converted into data in sequence and the slicing of the data are layer-by-layer simulated to acquire one or more predetermined printing paths of the each layer of the three-dimensional model. Step 21: a location information of a nozzle head of the three-dimensional printer are real-time captured. Step 31: each of the predetermined printing paths and an actual printing path are compared to acquire a matching result for detecting printing accuracy.

Preferably, in addition to the real-time capturing of the location information of nozzle head, an injection rate of the nozzle head is also real-time captured for drawing the actual printing path according to the location information of the nozzle head and the injection rate of the nozzle head to acquire the actual printing path of more accuracy.

The present invention provides an approach of real-time detecting printing accuracy by acquiring the location information of an actually printed object to construct a profile that would be further compared with model information. There are advantages for such the approach as follows. First, reduction of both printing materials and printing time may be achieved by alarming and automatically stopping printing once serious accuracy errors are found. Second, quantified instructions for model accuracy may be implemented by calculating accuracy of all layers (shape matching degree). Third, judgment on three-dimensional printing accuracy may be achieved by informing a three-dimensional printer to execute accuracy maintaining once there are error deviation of large degrees during printing multitudes of models.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional printer with printing accuracy detection, comprising:
   a three-dimensional model, each layer of the three-dimensional model having a printing path;
   a three-dimensional model conversion unit, which is provided for capturing the printing path of each layer of the three-dimensional model to convert the printing path of each layer of the three-dimensional model into data in sequence and is provided for layer-by-layer simulate slicing the data to acquire a predetermined printing path of the each layer of the three-dimensional model;
   an XYZ motors, which is actuated by the three-dimensional printer to control a nozzle head for printing after the data is received by the three-dimensional model conversion unit;
   a printing path locating unit, which is electrically coupled with the three-dimensional model conversion unit, and is provided to real-time capture a location information of the nozzle head of the three-dimensional printer;
   a printing path drawing unit, which is electrically coupled with the printing path locating unit and is provided for drawing out the actual printing path of the each layer according to the location information of the nozzle head;
   an injection rate acquisition unit, which is electrically coupled with the printing path drawing unit and is provided to real-time capture an injection rate of the nozzle head, so as to the printing path drawing unit draws out the actual printing path according to the location information of the nozzle head and the injection rate of the nozzle head; and a comparison unit, which is electrically coupled with the three-dimensional model conversion unit, and is provided to compare and analyze the predetermined printing path and an actual printing path to acquire a matching result relative to detecting printing accuracy, if the matching result over a tolerance range, the three-dimensional printer will stop printing.

2. The three-dimensional printer with printing accuracy detection of claim 1, further comprising an alarm unit configured to provide an alarm if the matching result is over a predetermined value.

3. The three-dimensional printer with printing accuracy detection of claim 1, wherein the printing path locating unit comprises a distance measurement apparatus configured to real-time capture the location information of the nozzle head.

4. The three-dimensional printer with printing accuracy detection of claim 3, further comprising an injection rate acquisition unit configured to real-time capture an injection rate of the nozzle head, wherein the printing path drawing unit draws out the actual printing path according to the location information of the nozzle head and the injection rate of the nozzle head.

5. The three-dimensional printer with printing accuracy detection of claim 1, further comprising an injection rate detection unit configured to real-time compare a predetermined injection rate of the nozzle head and a current injection rate of the nozzle head, and to determine whether the current injection rate of the nozzle head is within a normal range.

6. The three-dimensional printer with printing accuracy detection of claim 5, wherein the current injection rate of the nozzle head is estimated with a height of material at each position of the nozzle head, and wherein a determined height of the material is set to be H with an X tolerance, and wherein when an actual height of an extruded material by the nozzle head is over X tolerance during printing of a current layer, the amount of the extruded material is adjusted during printing of a next layer for equalizing a height deviation of the actual printing.

7. The three-dimensional printer with printing accuracy detection of claim 1, wherein the comparison unit acquires the matching result by analyzing a line curvature tolerance.

8. The three-dimensional printer with printing accuracy detection of claim 1, wherein the comparison unit acquires the matching result by analyzing an area matching degree.

9. A method for detecting printing accuracy of a three-dimensional printer, comprising:
provided a three-dimensional model and each layer of the three-dimensional model having a printing path;
converting a printing path of each layer of the three-dimensional model into data in sequence by a three-dimensional model conversion unit;
performing a layer-by-layer simulate slicing of the data to acquire a predetermined printing path of the each layer of the three-dimensional model by the three-dimensional model conversion unit;
actuating an XYZ motors for controlling a nozzle head for printing after the data is received by the three-dimensional printer;
performing a real-time capturing an injection rate of the nozzle head by a printing path locating unit;
performing a real-time capturing a location information of the nozzle head of the three-dimensional printer;
performing a drawing the actual printing path according to the location information of the nozzle head and the injection of the nozzle head by a printing path drawing unit; and
comparing the predetermined printing path and an actual printing path to acquire a matching result for detecting printing accuracy, if the matching result over a tolerance range, the printing process is stopped by the three-dimensional printer.

* * * * *